(12) United States Patent
Katsuda et al.

(10) Patent No.: US 10,401,666 B2
(45) Date of Patent: Sep. 3, 2019

(54) WATERPROOF ELECTRONIC DEVICE

(71) Applicant: CASIO COMPUTER CO., LTD., Shibuya-ku (JP)

(72) Inventors: Hiroshi Katsuda, Kodaira (JP); Akira Suzuki, Fuchu (JP); Akihisa Ohmura, Hachioji (JP); Hiroki Nishiyama, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/845,586

(22) Filed: Dec. 18, 2017

(65) Prior Publication Data
US 2018/0180928 A1 Jun. 28, 2018

(30) Foreign Application Priority Data

Dec. 22, 2016 (JP) .................. 2016-249248

(51) Int. Cl.
*G02F 1/1333* (2006.01)
*G04B 37/08* (2006.01)
(52) U.S. Cl.
CPC ....... *G02F 1/133308* (2013.01); *G04B 37/08* (2013.01); *G02F 2001/133311* (2013.01); *G02F 2001/133331* (2013.01); *G04B 37/081* (2013.01)
(58) Field of Classification Search
CPC ... G02F 1/133308; G02F 2001/133331; G02F 2001/133311; G06F 1/16; G06F 1/163; G06F 1/1601; G06F 1/1613; G06F 1/1626; G04B 37/08–088; G04B 37/10; G04B 37/11; G04B 37/103; G04B 37/106; G04B 37/113; G04B 37/116
See application file for complete search history.

(56) References Cited

U.S. PATENT DOCUMENTS

| 8,794,824 B2 * | 8/2014 | Hirayama | G04B 37/084 368/294 |
| 2012/0327750 A1 * | 12/2012 | Nakamura | G04C 10/00 368/205 |
| 2014/0260550 A1 * | 9/2014 | Kil | G01M 3/3272 73/40 |
| 2015/0077912 A1 * | 3/2015 | Ishibashi | H01M 2/1066 361/679.03 |
| 2018/0032032 A1 * | 2/2018 | Yanagisawa | G04B 37/02 |

FOREIGN PATENT DOCUMENTS

JP 2005-106496 4/2005

* cited by examiner

*Primary Examiner* — Steven T Sawyer
*Assistant Examiner* — Sagar Shrestha
(74) *Attorney, Agent, or Firm* — Cozen O'Connor

(57) ABSTRACT

A waterproof electronic device includes a waterproof case in which electronic components are embedded and a display which is able to display and which is placed in an opening of the waterproof case in an air tight manner. The waterproof electronic device includes a space for waterproof testing therein and the waterproof electronic device includes a window for waterproof testing at positions (i) corresponding to the space for waterproof testing and (ii) avoiding the display.

7 Claims, 3 Drawing Sheets

WATERPROOF ELECTRONIC DEVICE

CROSS-REFERENCE TO RELATED APPLICATIONS

This application is based upon and claims the benefit of priority under 35 USC 119 of Japanese Patent Application No. 2016-249248 filed on Dec. 22 2016, the entire disclosure of which, including the description, claims, drawings, and abstract, is incorporated herein by reference in its entirety.

BACKGROUND OF THE INVENTION

1. Field of the Invention

The present invention relates to a waterproof electronic device.

2. Description of Related Art

With respect to a waterproof time piece, as described in JP2005-106469A, there is known a waterproof testing where a time piece is placed under water and thereafter, whether water has entered in the time piece is determined on the basis of whether water drops are attached on the cover glass under a predetermined condition.

Further, there is now known a wrist watch type information device.

Such wrist watch type information device includes a display formed of a liquid crystal display, touch panel and the like as the part for displaying information for a user to see.

BRIEF SUMMARY OF THE INVENTION

In accordance with one aspect of the present invention, there is provided a waterproof electronic device, including:
 a waterproof case in which electronic components are embedded; and
 a display which is able to display and which is placed in an opening of the waterproof case in an air tight manner,
   wherein
   the waterproof electronic device includes a space for waterproof testing therein, and
   the waterproof electronic device includes a window for waterproof testing at positions (i) corresponding to the space for waterproof testing and (ii) avoiding the display.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE INVENTION

Hereinafter, an embodiment for implementing the present invention will be explained in detail with reference to the drawings.

Embodiment

Figure 1:
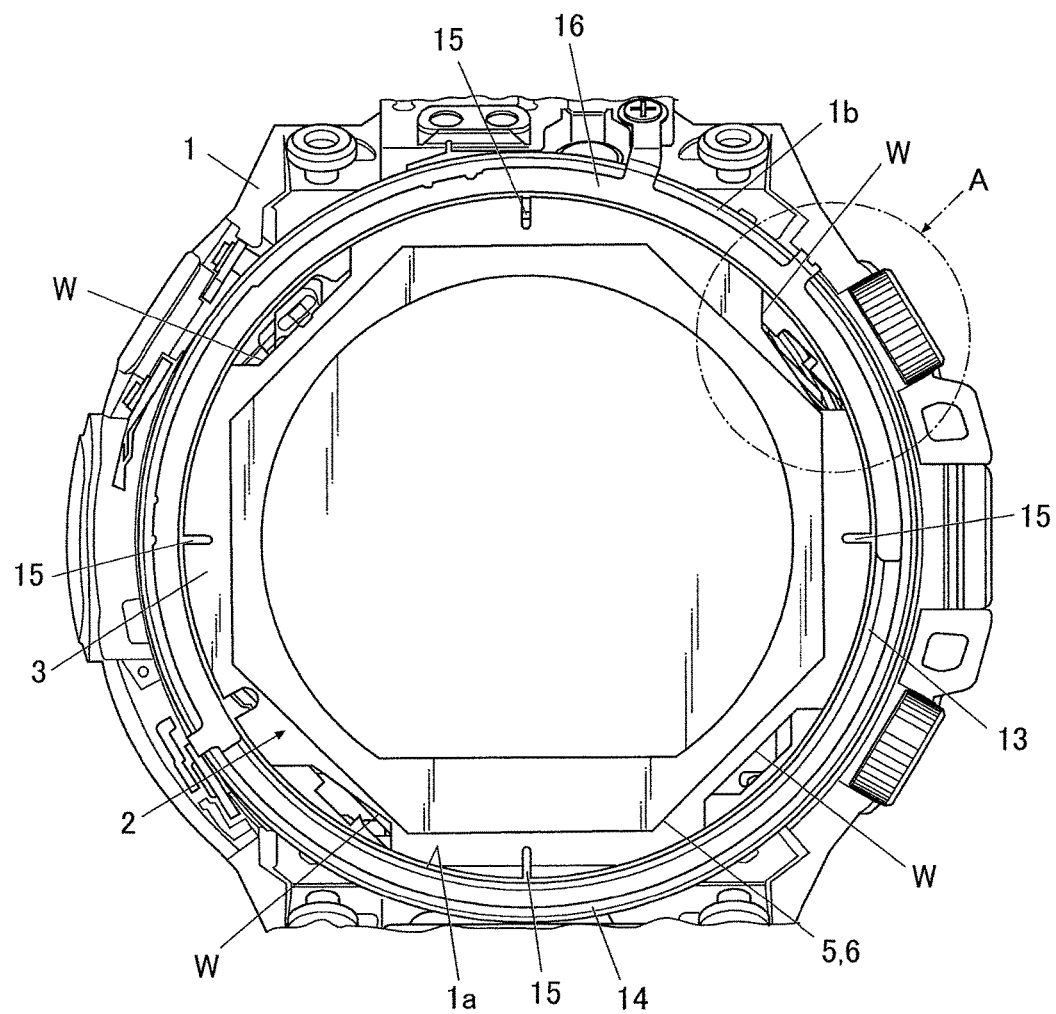
FIG. 1 illustrates a configuration of an embodiment of an electronic device to which the present invention is applied and is a schematic plan view of a wrist watch type waterproof wearable device.
Figure 2:
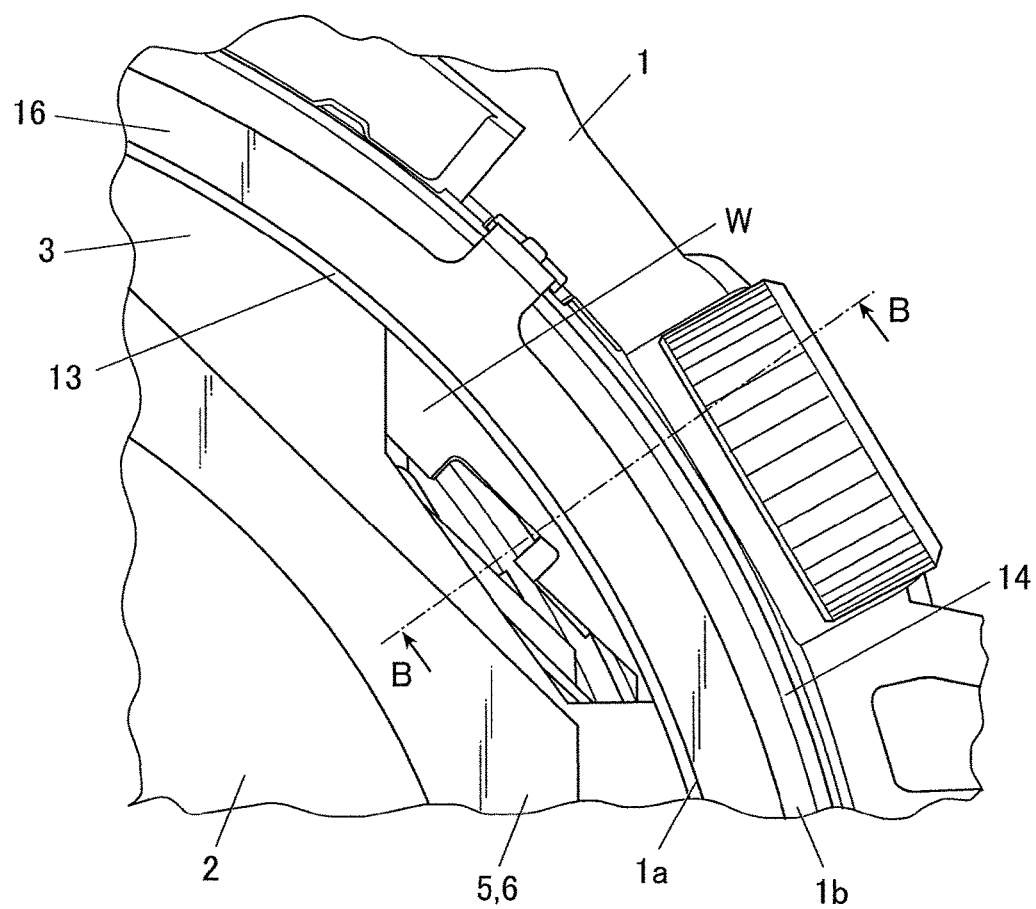
FIG. 2 is an enlarged view of a window for waterproof testing which is indicated by an arrow A in FIG. 1.
Figure 3:
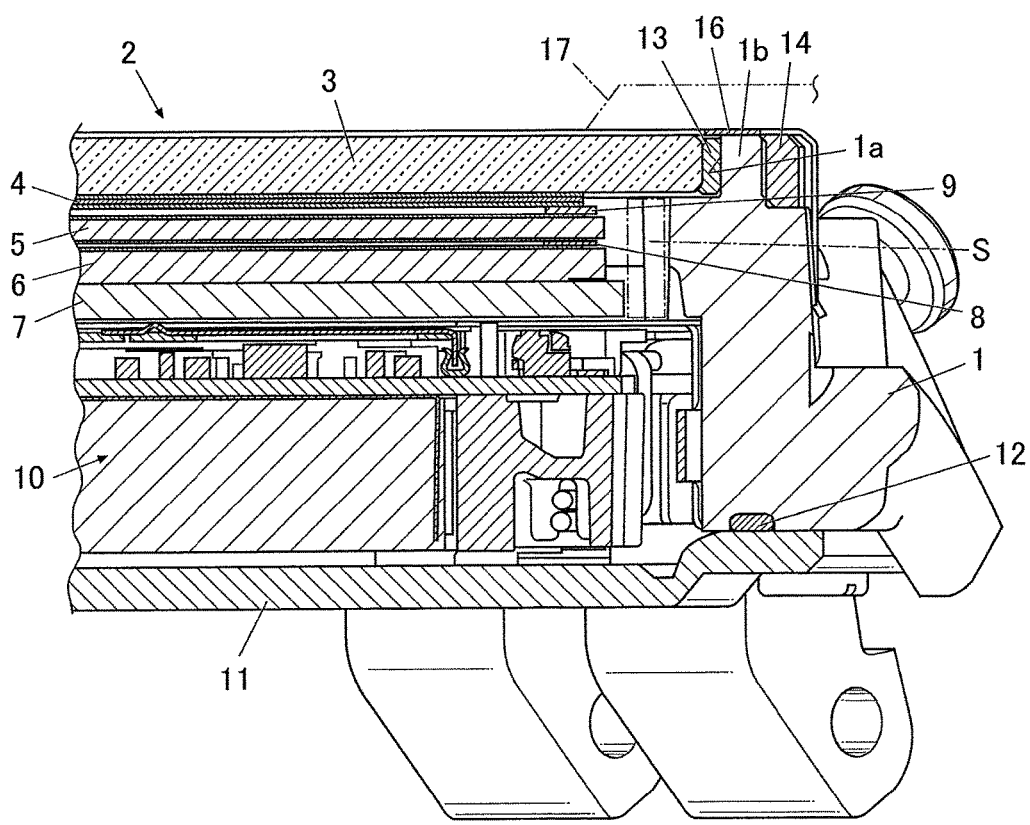
FIG. 3 is a cross-sectional view when cut along the arrow line B-B shown in FIG. 2.

FIG. 1 illustrates a wrist watch type waterproof wearable device (smart watch) as a schematic configuration of an embodiment of an electronic device to which the present invention is applied. FIG. 2 illustrates an enlarged view of a window for waterproof testing which is indicated by the arrow A in FIG. 1. FIG. 3 illustrates a cross-sectional view when cut along the arrow line B-B shown in FIG. 2.

In the drawings, 1 indicates the waterproof case, 2 indicates the display/operating unit (display), 3 indicates the cover glass (transparent member), 4 indicates the touch panel (operating member), 5 indicates the PN liquid crystal panel (display member), 6 indicates the TFT liquid crystal panel (display member), 7 indicates the back light, S indicates a space for waterproof testing and W indicates the window for waterproof testing.

As shown in the drawings, in the round opening 1*a* which is formed on the upper surface of the wrist watch type waterproof case 1, the display/operating unit 2 by which a user can operation the device in the embodiment is placed as the display on which information can be displayed, the display/operating unit 2 being placed therein in the air tight manner.

The display/operating unit 2 is a layered body of a transparent cover glass 3 which is assembled so as to fit in the opening 1*a* of the waterproof case 1 in the air tight manner, a plate-like operating member 4 which is attached on the inner side of the cover glass 3 and two plate-like display members 5 and 6 which are housed inside the waterproof case 1.

That is, as shown in FIG. 3, a touch panel 4 formed of a transparent conductive film which is the plate-like operating member is attached on the under surface of the cover glass 3 and a design for decoration is printed so as to surround the touch panel 4.

Further, the display member which is housed inside the waterproof case 1 is a layered body of the PN liquid crystal panel 5 which is formed by enclosing the PN (polymer dispersed type) liquid crystal between the upper and lower glasses and the TFT liquid crystal panel 6 which is formed by enclosing the TFT (Thin Film Transistor) liquid crystal between the upper and lower glasses. The display member is further provided with the back light 7 such as a LED panel or the like which lights the layered body from the back.

Further, the double faced adhesive tape 8 is applied along the periphery between the TFT liquid crystal panel 6 which is attached on the back light 7 so as to be layered thereon and the PN liquid crystal panel 5 which is placed on the TFT liquid crystal panel 6 so as to attached the TFT liquid crystal panel 6 and the PN liquid crystal panel 5 to each other. Furthermore, the double faced adhesive tape 9 is applied along the periphery between the PN liquid crystal panel 5 and the touch panel 4 which is attached to the under surface of the cover glass 3, the touch panel 4 being placed on the PN liquid crystal panel 5, so as to attach the PN liquid crystal panel 5 and the touch panel 4 to each other.

Here, in the waterproof case 1, various types of electronic parts 10 including a control substrate, a battery cell and the like are housed below the back light 7.

Moreover, the under surface of the waterproof case 1 is provided with a back cover 11 via the waterproof packing 12 in the air tight manner.

In the embodiment, the PN liquid crystal panel 5, the TFT liquid crystal panel 6 and the back light 7 are formed so that the outline shape thereof be regular octagonal shape and the double faced adhesive tapes 8 and 9 are formed so that their outline shape be the corresponding regular octagonal shape and the inner shape be an approximately circle shape.

Further, as shown in FIG. 3, the spaces S for waterproof testing are formed around the PN liquid crystal panel 5, the TFT liquid crystal panel 6 and the back light 7.

Furthermore, as shown in FIG. 1, the windows W for waterproof testing are formed along the outer circumference of the cover glass 3 at the positions avoiding the display/operating unit 2. The windows W for waterproof testing are formed at the positions corresponding to the spaces S for waterproof testing without having the decoration printed thereon so that the inside thereof can be seen.

Here, the cover glass 3 is pressed in to the opening 1*a* of the waterproof case 1 via the waterproof ring 13 made of elastomer so as to be assembled in the air tight manner.

When the cover glass 3 is being pressed in via the waterproof ring 13, the circumference wall 1*b* of the opening 1*a* is prevented form deforming due to the holding of the holding ring 14 which fits tightly around the circumference wall 1*b*.

As shown in FIG. 1, four windows W for waterproof testing are respectively formed along the four sides between the positioning markers 15, the positioning markers 15 being provided at the four ends of the lines in the vertical direction and in the horizontal direction that form a cross, on the cover glass 3 in the embodiment. The windows W are formed so as to have equal intervals therebetween.

Here, the GPS antenna 16 is formed along the upper surface of the circumference wall 1*b* of the opening 1*a*.

As described above, according to the waterproof wearable device of the embodiment, the spaces S for waterproof testing that are provided around the display/operating unit 2 are formed inside the waterproof case 1 and the windows W for waterproof testing are formed in the cover glass 3 at the positions corresponding to the spaces S for waterproof testing.

Therefore, the above described waterproof testing can be carried out even if the device is the wrist watch type information device to determine whether water has entered in the waterproof case 1 by looking through the windows W for waterproof testing of the cover glass 3.

Further, after the waterproof testing is carried out, the windows W for the waterproof testing of the cover glass 3 are covered by fitting the outer member 17 which is a ring shaped auxiliary member around the display/operating unit 2 of the waterproof case 1 as shown by the imaginary line in FIG. 3.

Modification Example

In the above described embodiment, the wrist watch type waterproof wearable device such as a smart watch is exemplified. However, the present invention is not limited to what is exemplified in the embodiment and it can be waterproof electronic devices of other information devices such as mobile phones and the like.

Further, the shapes and the like of the case, the display/operating unit, the spaces for waterproof testing and the windows for waterproof testing can be in any shape, and it is needless to say that other specific detail configurations and the like can also be arbitrarily modified.

Furthermore, the windows W for waterproof testing are formed along the outer circumference of the cover glass 3 in the embodiment. However, this is not limitative in any way. The windows W for waterproof testing can be formed, for example, by processing the waterproof case 1 which is a configuration different from the display/operating unit as long as the windows W are formed at the positions corresponding to the spaces S for waterproof testing.

Although several embodiments of the present invention are described above, the scope of the present invention is not limited to the above described embodiments and the scope of the present invention includes the scope of the claims and the equivalents thereof.

What is claimed is:

1. A waterproof electronic device, comprising:
   a waterproof case in which electronic components are embedded;
   a display arranged in an opening of the waterproof case in an air tight manner;
   a plate-like transparent member disposed on the display;
   a first closed space for waterproof testing of the waterproof electronic device;
   a second closed space disposed on the transparent member; and
   an outer member which covers a circumference of the display and which is fitted to the waterproof case,
   wherein
   the waterproof electronic device includes a window for waterproof testing at a position corresponding to the first closed space,
   the display includes a layered structure of a plate-like display member,
   the second closed space is superposed on the plate-like display member,
   the first closed space is not superposed on the plate-like display member,
   the first closed space is disposed along the circumference of the display,
   the window for waterproof testing is disposed at a position corresponding to the first closed space for waterproof testing along the circumference of the display, and
   the outer member is fitted to cover the first closed space and the window for waterproof testing.

2. The waterproof electronic device of claim 1, wherein a plurality of the first closed spaces for waterproof testing and a plurality of the windows for waterproof testing are arranged along a circumference direction of the display having intervals therebetween.

3. The waterproof electronic device of claim 1, wherein
   the display has an operating member,
   the plate-like transparent member is disposed on an outer surface side of a layered body of the display member and the operating member, and
   the window for waterproof testing is arranged on an outer circumference side of the transparent member.

4. The waterproof electronic device of claim 2, wherein
   the display has an operating member,
   the plate-like transparent member is disposed on an outer surface side of a layered body of the display member and the operating member, and
   the window for waterproof testing is arranged on an outer circumference side of the transparent member.

5. The waterproof electronic device of claim 3, wherein a printed section is arranged at a part on the outer circumference side of the transparent member avoiding the windows for waterproof testing.

6. The waterproof electronic device of claim 3, wherein
the transparent member is pressed in to the opening of the waterproof case via a waterproof ring, and
the waterproof electronic device further includes a holding ring which fits tightly around an outer circumference of a circumference wall which encircles the opening of the waterproof case.

7. The waterproof electronic device of claim 5, wherein
the transparent member is pressed in to the opening of the waterproof case via a waterproof ring, and
the waterproof electronic device further includes a holding ring which fits tightly around an outer circumference of a circumference wall which encircles the opening of the waterproof case.

\* \* \* \* \*